United States Patent
Cooksey et al.

(10) Patent No.: US 6,918,238 B2
(45) Date of Patent: Jul. 19, 2005

(54) PRELOADABLE, EXTERNALLY INSTALLABLE AND REMOVABLE BEARING AND SHAFT ASSEMBLY

(75) Inventors: William L. Cooksey, Geneseo, IL (US); Herbert M. Farley, Elizabethtown, PA (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/623,744

(22) Filed: Jul. 21, 2003

(65) Prior Publication Data

US 2005/0020421 A1 Jan. 27, 2005

(51) Int. Cl.$^7$ ............................................. A01D 61/00
(52) U.S. Cl. .................... 56/16.4 R; 197/37; 197/35 R; 198/788; 198/780; 474/135; 411/160; 411/163
(58) Field of Search ................. 56/16.4 R, 16.5 R; 197/37, 35 R; 198/788, 790; 474/135; 411/160, 163

(56) References Cited

U.S. PATENT DOCUMENTS

| | | | |
|---|---|---|---|
| 1,820,055 A | 8/1931 | Divoky | |
| 2,135,175 A | * 11/1938 | Fallon | 432/249 |
| 4,253,343 A | * 3/1981 | Black et al. | 474/135 |
| 4,369,617 A | * 1/1983 | Hanaway et al. | 56/14.6 |
| 4,422,227 A | 12/1983 | Illg | 29/116 |
| 4,428,182 A | 1/1984 | Allen et al. | 56/14.6 |
| 4,681,215 A | 7/1987 | Martin | 198/843 |
| 5,088,596 A | * 2/1992 | Agnoff | 198/788 |
| 5,254,070 A | 10/1993 | Callhoff | 492/16 |
| 5,547,448 A | 8/1996 | Robertson | 492/16 |
| 6,070,816 A | 6/2000 | Hirsch | 241/101.742 |
| 6,076,647 A | * 6/2000 | Agnoff | 193/37 |
| 6,419,070 B1 | * 7/2002 | Agnoff | 193/37 |
| 6,726,003 B2 | * 4/2004 | Itoh et al. | 198/788 |
| 6,726,006 B1 | * 4/2004 | Funderburk et al. | 206/268 |

* cited by examiner

Primary Examiner—Árpád Fab Kovács
(74) Attorney, Agent, or Firm—Brant T. Maurer; Rebecca Henkel

(57) ABSTRACT

An externally installable and removable bearing and shaft assembly for supporting an end of a rotatable member for rotation relative to a support member or structure, which when installed, applies an axial preload force against a shaft of the assembly, for reducing the occurrence of flexure or bending of the shaft due to side loads during the rotation which can lead to fatigue failure including shaft breakage.

18 Claims, 3 Drawing Sheets

PRELOADABLE, EXTERNALLY INSTALLABLE AND REMOVABLE BEARING AND SHAFT ASSEMBLY

TECHNICAL FIELD

This invention relates generally to a bearing and shaft assembly for supporting an end of a rotatable member, and more particularly, to a bearing and shaft assembly installable and removable from an opposite side or exterior of a support member or structure supporting the rotatable member, and which, when installed, applies an axial preload force against a shaft of the bearing assembly for reducing the potential for fatigue failure.

BACKGROUND

Commonly, rotatable members are supported for rotation in difficult to access locations on and in a variety of machines, and are subjected to rigorous loading conditions that can adversely affect and shorten the life of bearings and shafts supporting the rotatable members. For instance, feeder assemblies of agricultural combines which transfer and convey all of the harvested crop and other material from the header to a threshing section of the combine, include rotatably driven sprocket assemblies, drums, rollers, and the like, for propelling moving chains that convey the crop material through an interior space of the feeder into the thresher. Feeders can also include optional rotating beaters for separating hard items such as rocks that could potentially damage components of the combine, from the crop material being fed into the thresher. Typically, it is desirable to maintain the ends of the rotating sprocket assemblies, drums, and beaters, in close proximity to the interior surface or side sheet of a feeder house or housing of the feeder, to prevent long crop material, such as stalks, vines, and the like, from wrapping around shafts and bearings supporting the ends of the sprocket assemblies, drums, beaters and the like, for avoiding overloading or stalling the drive and other problems. However, affording such close proximity of the rotating members to the interior sides of the enclosures makes it difficult to access bearings and shafts supporting the ends of the rotatable members for installation, service, maintenance and replacement. This can be a problem as combine down time for partial disassembly of a feeder housing or enclosure for replacing a shaft and/or a bearing can be costly both timewise and financially, and there is the risk of improper reassembly as a consequence of difficult access. Another potential problem is fatigue failure of shafts as a result of side loading conditions.

Thus, what is sought is a bearing and shaft assembly for supporting an end of a rotatable member, which is completely installable and removable and replaceable from an opposite side of a member supporting the bearing and shaft assembly, and, which is resistant to fatigue failure.

SUMMARY

What is disclosed is an externally installable and removable bearing and shaft assembly for supporting an end of a rotatable member for rotation relative to a support member or structure, which overcomes many of the problems and shortcomings set forth above. When installed, an axial preload force can be applied against a shaft of the assembly, for reducing the occurrence of flexure or bending of the shaft due to side loads during the rotation which can lead to fatigue failure including shaft breakage.

According to a preferred aspect of the invention, the bearing and shaft assembly is mountable in an opening through a support member for supporting an end of a rotatable member for rotation relative thereto. The bearing and shaft assembly includes a bolt having a threaded end portion threadedly receivable and engageable in a threaded hole in the end of the rotatable member, an opposite end positionable in the opening through the support member including an enlarged head having a shoulder therearound facing the threaded end portion, and a cylindrical shaft portion extending between the threaded end portion and the opposite end portion. The assembly includes a bearing having relatively rotatable inner and outer rings, the inner ring having oppositely facing axial ends extending around a central hole therethrough adapted for receiving the shaft portion of the bolt, and the outer ring includes at least one mounting element for mounting the bearing on a side of the support member opposite the rotatable member in the opening through the support member. The bolt is insertable through the inner ring of the bearing and threadedly engageable with the threaded hole of the rotatable member for holding the inner ring of the bearing thereagainst for rotation therewith while exerting an axial tensile preload force on the bolt, and the outer ring is mountable in the opening through the support member, for supporting the end of the rotatable member for rotation on the support member.

The support member can be a side sheet of an enclosure such as a feeder housing of an agricultural combine, and the rotatable member can include a rock trap beater, conveyor sprocket member, drum, roller, or other member partially or completely enclosed within the housing for rotation therein. The bearing and shaft assembly enables the end of the rotatable member to be positioned in closely spaced relation to the side sheet or other support member.

As an advantage of the present bearing and shaft assembly, installation, removal, and replacement of the bearing and shaft assembly can be accomplished completely from the opposite side or exterior of the support member. Also, the bolt, when tightened into the end of the rotatable member, is brought to bear against the inner ring of the bearing, to hold it against the rotatable member for rotation therewith, for eliminating the need for a retainer, keeper or the like, or end play adjustment. As another advantage of tightening the bolt so as to hold or clamp the bearing, an axial preload tensile force can be generated in the bolt, so as to resist flexure and bending of the bolt under side loading conditions, thereby reducing the potential for fatigue failure of the bolt.

DETAILED DESCRIPTION OF THE PREFERRED EMBODIMENTS

Figure 1:
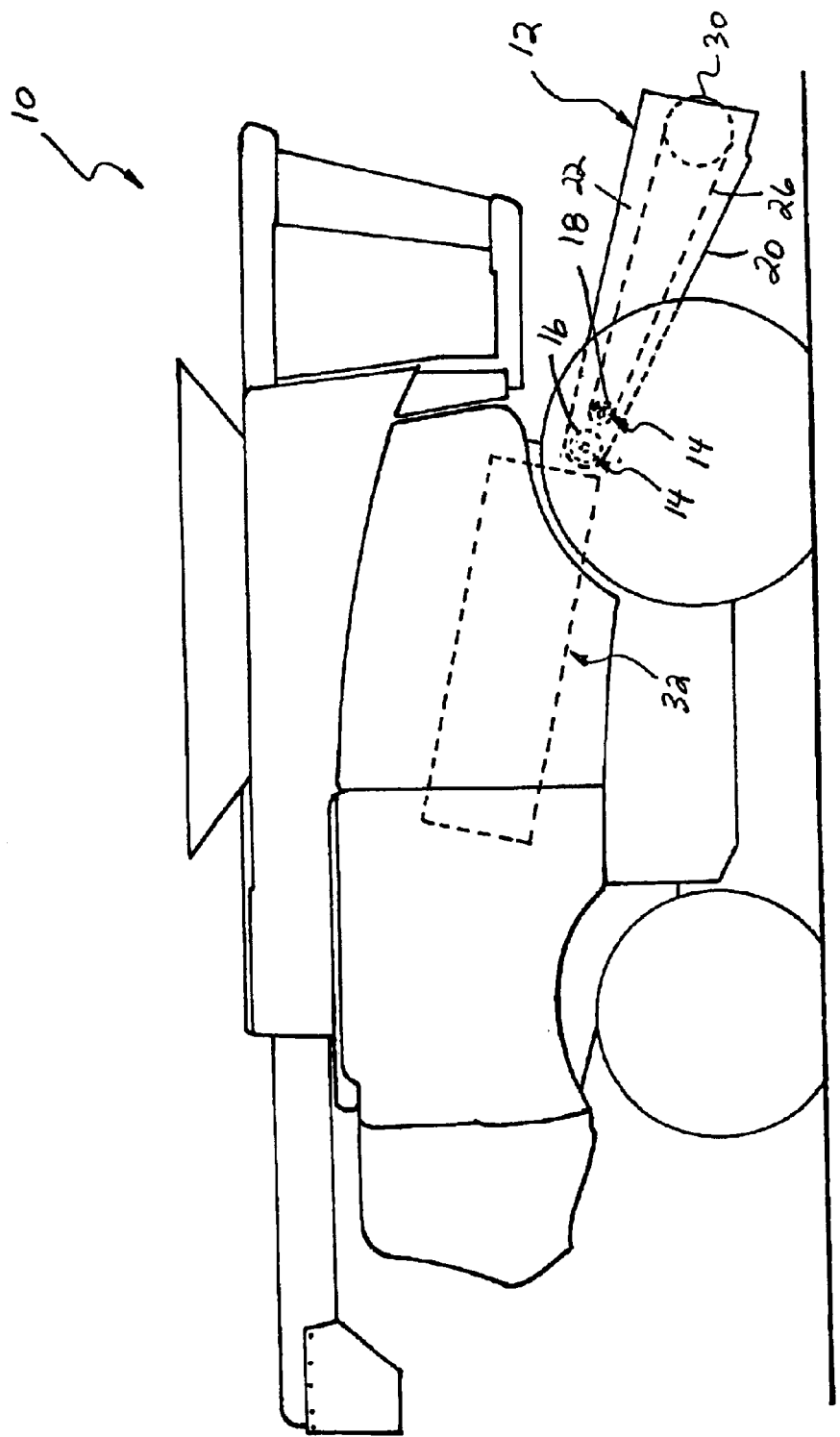
FIG. 1 is a simplified side view of an agricultural combine having a feeder including preloadable, externally installable and removable bearing and shaft assemblies according to the present invention supporting a conveyor sprocket shaft and a rock trap beater of the feeder.

Referring now to the drawings, in FIG. 1, a conventional agricultural combine 10 having a feeder 12 including a pair of preloadable, externally installable and removable bearing and shaft assemblies 14 constructed and operable according to the teachings of the present invention, for supporting ends of a rock trap beater 16 and a conveyor sprocket shaft 18 for rotation within an interior space of a feeder house 20 of feeder 12, is shown.

Figure 2:
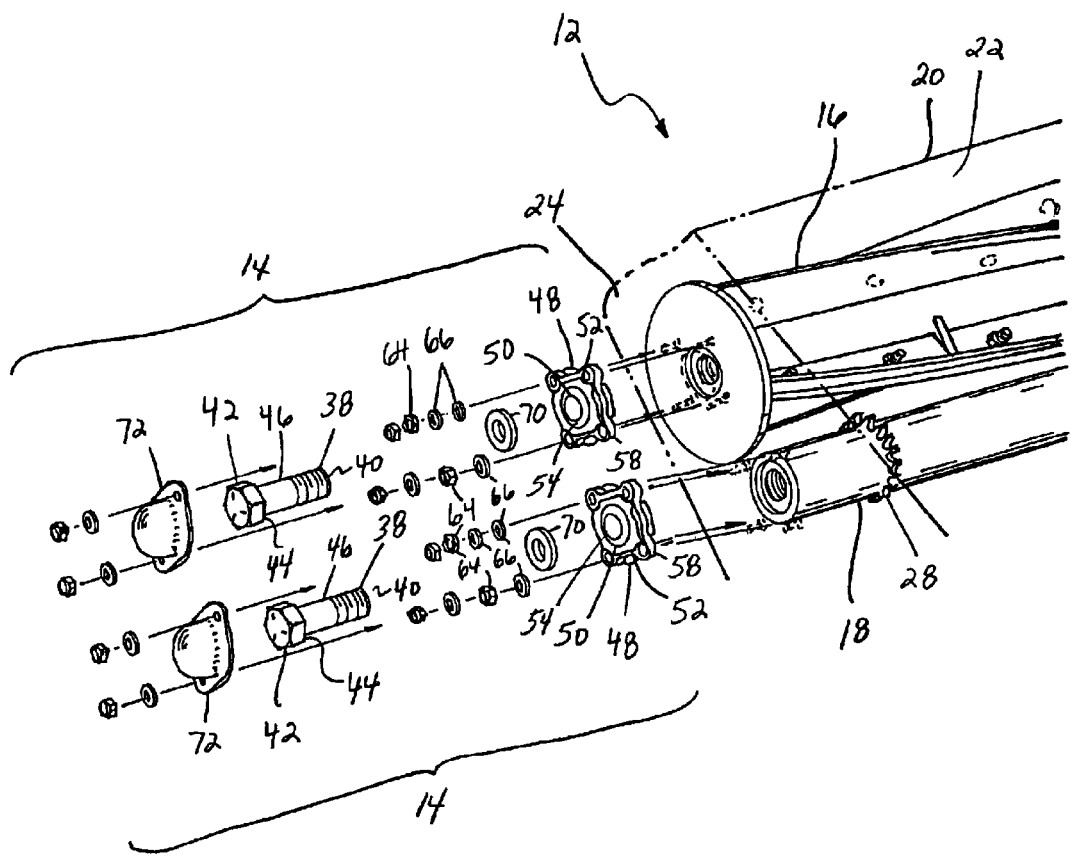
FIG. 2 is a fragmentary perspective view of an end of the feeder of FIG. 1 including the rock trap beater and conveyor sprocket shaft, showing the bearing and shaft assemblies of the invention associated therewith in exploded form.
Figure 3:
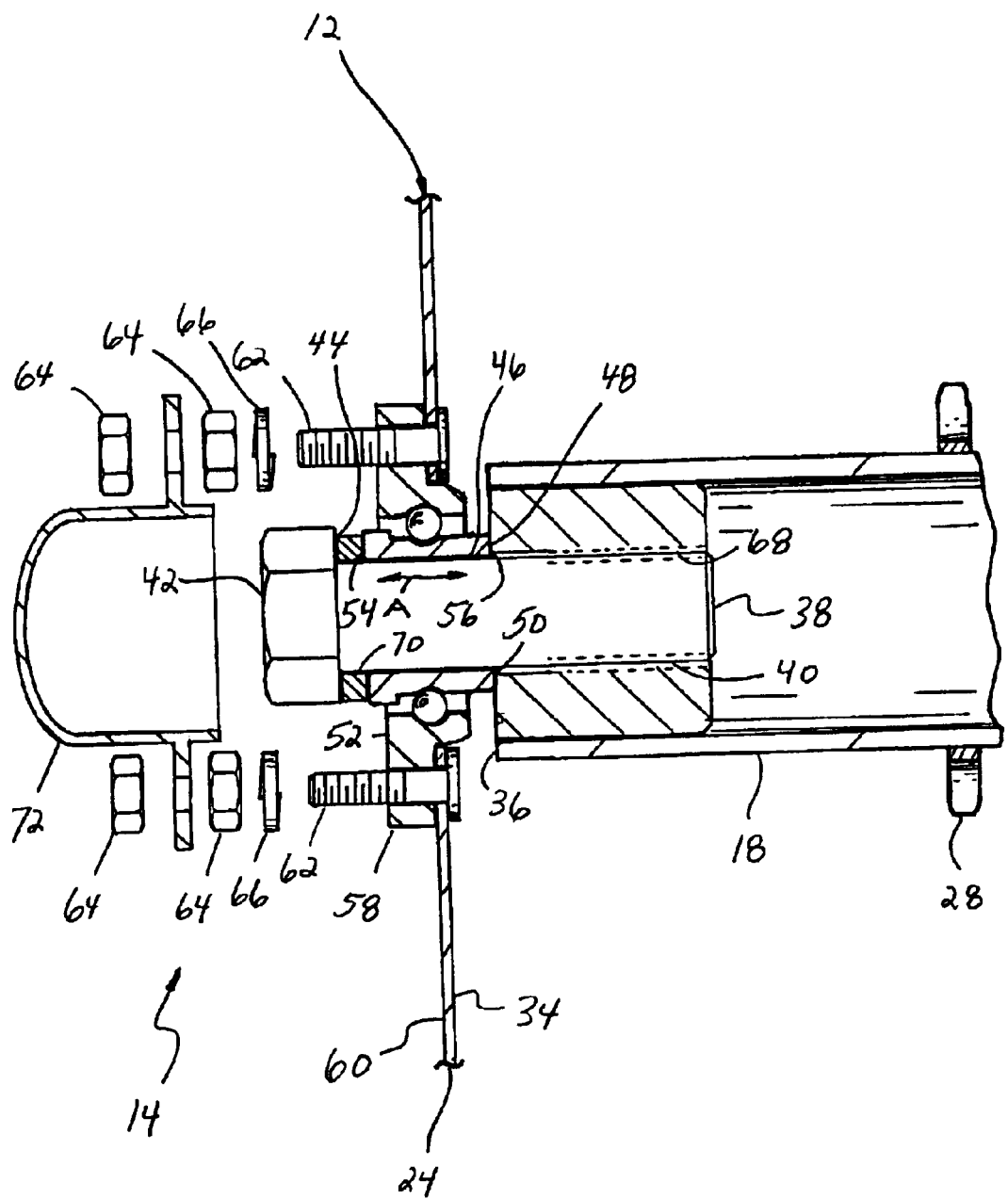
FIG. 3 is an enlarged fragmentary sectional view of the conveyor sprocket shaft and associated bearing and shaft assembly of FIGS. 1 and 2, illustrating an order of assembly of components thereof.

Referring also to FIG. 2, wherein rock trap beater 16 and conveyor sprocket shaft 18 and bearing and shaft assemblies 14 are better shown, rock trap beater 16 and conveyor sprocket shaft 18 are located in an upper end of an interior space 22 defined by sheet metal members forming feeder house 20, including a generally planar side sheet 24 which serves as a support member for the ends of beater 16 and shaft 18 shown. The opposite ends of beater 16 and shaft 18 (not shown) are each supported adjacent an opposite side sheet and are connected in rotatably driven relation to a suitable power source or power sources, such as a fluid motor, belt drive, drive shaft arrangement, or the like (also not shown). Essentially, in operation, sprocket shaft 18 is rotated by its power source, to drive a plurality of chains 26, shown in FIG. 1, which encircle sprockets 28 on shaft 18 and a drum 30 at an opposite or forward end of feeder house 20, in a clockwise direction, for conveying crop material upwardly and rearwardly through feeder house 20 to a threshing section 32 within combine 10, in the conventional, well known manner. Rock trap beater 16 is an optional member, and is positioned just rearwardly of sprocket shaft 18 and is rotatable by its power source in contact with the flow of crop material, for separating rocks and other hard objects therefrom and directing them into a rock trap for disposal. For good crop material flow through feeder house 20, and to facilitate smooth rotation of beater 16 and sprocket shaft 18, it is desirable to minimize the number of locations within interior space 22 where crop material, such as plant stalks and stems, branches, and weedy vines and the like, can wrap or become caught so as to impede material flow. Thus, it is desirable for the ends of beater 16 and shaft 18 to be located in close proximity to an interior surface 34 of side sheet 24, as best represented in FIG. 3 by the closely spaced relationship between end 36 of shaft 18 and interior surface 34. However, such close proximity makes it difficult to install, service, replace, and maintain bearings and/or shafts, as well as keepers, spacers, and the like used for maintaining a uniform distance from the end of the sprocket shaft or beater, such as end 36, and surface 34, due to the limited access to the region between the bearing and the end of the rotatable member. As an additional problem, rotatable members such as shaft 18 are subject to significant side loads when conveying crop material through feeder house 20, which loads can even be increased when larger than usual amounts of the crop material are being conveyed, or there is clogging or blockage. If the shaft or other member supporting the end of the sprocket shaft or other rotatable member is allowed to flex or bend while rotating, fatigue failure, such as breakage of the supporting shaft can result. If the end shaft is part of the sprocket shaft or other rotatable member, or is difficult to remove therefrom, substantial downtime and costs can be incurred for repair. To avoid this problem, while maintaining the desired closely spaced relationship between end 36 and interior surface 34, it is desirable to have the capability for installing a supporting bearing and shaft assembly, such as assembly 14, from the exterior of feeder house 20.

FIGS. 2 and 3 best show the construction and ability to install and remove bearing and shaft assemblies 14 from the ends of beater 16 and sprocket shaft 18, from the exterior of feeder house 20. Each bearing and shaft assembly 14 includes a bolt 38 having a threaded end portion 40, an opposite, larger head end portion 42 having a shoulder 44 therearound facing threaded end portion 40, and a cylindrical shaft portion 46 extending between threaded end portion 40 and head end portion 42. Each bearing and shaft assembly 14 additionally includes a bearing 48 having relatively rotatable inner and outer rings 50 and 52. Inner ring 50 has oppositely facing axial ends 54 and 56 extending around a central hole therethrough adapted for receiving shaft portion 46 of a bolt 38. Outer ring 52 of each bearing 48 includes at least one mounting element 58 for mounting bearing 48 on a desired support member or structure, such as an exterior surface 60 of side sheet 24. Here, each mounting element 58 is a flange extending around outer ring 52 and includes spaced holes therethrough adapted for receiving threaded ends of bolts or studs 62 suitably mounted on sheet 24, such as by welding or the like. Mounting elements 58 are held against exterior surface 60 by nuts 64 and washers 66 threadedly engageable therewith in the well known manner.

Threaded end portion 40 and shaft portion 46 of bolts 38 are insertable through inner rings 50 of bearings 48 and threaded end portions 40 threadedly engaged with an internally threaded hole 68 in end 36 of sprocket shaft 18 and in corresponding end of beater 16 for holding axial end 56 of inner ring 50 against end 36 to prevent relative rotation thereof while allowing rotation thereof relative to outer ring 52. When this occurs, shoulder 44 of head end portion 42 can directly abut axial end 54 of inner ring 50 (not shown), or an annular spacer 70 disposed between shoulder 44 and end 54, to allow adjusting threaded engagement between threaded end portion 40 and threaded hole 68. When bolt 38 is tightened onto end 36, an axial or longitudinal preload tensile force will be applied to shaft portion 46 of bolt 38, as illustrated by arrow A in FIG. 3, which is useful for resisting flexure and/or bending of shaft portion 46 under the anticipated side loads applied thereto by the rotating members such as beater 16 or sprocket shaft 18. This is expected to reduce the occurrence of fatigue problems such as fracture and breakage of bolts 38. An optional dust cover 72 is shown positionable over head end portion of bolt 38 and inner ring 50 of bearing 48 and is securable to studs 62 by additional nuts 64.

FIGS. 2 and 3 also illustrate the ease of removal and changing of bearing and shaft assemblies 14, which is essentially in the reverse order of installation. For instance, nuts 64 can be removed from studs 62 and bolt 38 removed from threaded hole 68.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A bearing and shaft assembly for mounting in an opening through a support member for supporting an end of a rotatable member for rotation relative thereto under an axial preload condition, comprising:

a bolt having a threaded end portion threadedly receivable and engageable in a threaded hole in the end of the rotatable member, an opposite end portion positionable in the opening through the support member including an enlarged head having a shoulder therearound facing the threaded end portion, and a cylindrical shaft portion extending between the threaded and opposite end portions; and a bearing having relatively rotatable inner and outer rings, the inner ring having oppositely facing axial ends extending around a central hole therethrough adapted for receiving the shaft portion of the bolt, and the outer ring including at least one mounting element extending outwardly therefrom and adapted for fixedly mounting the outer ring on a side of the support member opposite the rotatable member such that the inner ring will be positioned and supported by the outer ring in the opening through the support member for rotation relative to the outer ring and the support member;

wherein the threaded end portion and cylindrical shaft portion of the bolt are insertable through the inner ring of the bearing and the threaded end portion threadedly engageable with the threaded hole of the rotatable member for holding the inner ring of the bearing thereagainst for rotation therewith relative to the outer ring and the support member while exerting an axial tensile force on the bolt, and supporting the end of the rotatable member for rotation on the support member.

2. The bearing and shaft assembly of claim 1, further comprising an annular spacer positionable around a portion of the shaft portion of the bolt between the inner ring of the bearing and the head of the bolt for adjusting a length of threaded engagement of the bolt with the rotatable member.

3. The bearing and shaft assembly of claim 1, wherein the rotatable member is at least partially contained in an interior of an enclosure adjacent to the support member, the opening through the support member extending from an exterior of the enclosure to the interior, and wherein the bolt is insertable through the opening through the support member from the exterior to the interior and threadedly engageable with the threaded hole of the rotatable member, and the at least one mounting element of the outer ring of the bearing is engageable with elements on the exterior of the support member, such that the bearing assembly is installable and removable from the exterior of the enclosure.

4. The bearing and shaft assembly of claim 3, wherein the enclosure comprises a feeder housing of an agricultural combine, and the rotatable member comprises a rock trap beater or conveyor sprocket shaft, the at least one mounting element comprising a flange adapted to be mounted by fasteners to a side of the feeder housing.

5. The bearing and shaft assembly of claim 4, wherein the support member comprises a side sheet of the feeder housing and the end of the rock trap beater or conveyor sprocket shaft is located closely adjacent to an interior surface of the side sheet, the inner ring extending axially beyond the flange so as to extend into an interior of the feeder housing when mounted thereon.

6. A bearing assembly comprising:

a member rotatable in an interior space of an enclosure in closely spaced proximity to a support member located adjacent to the space;

an elongate bolt including a cylindrical portion extending longitudinally from a larger head to a threaded end; and a bearing including an inner ring and an outer ring supported around the inner ring for relative rotation therebetween, the inner ring including a center hole therethrough receiving the cylindrical portion of the bolt, and the outer ring including at least one mounting element fixedly mounted to a portion of the support member external to the interior space mounting the outer ring in or over an opening through the support member for preventing rotation of the outer ring while allowing rotation of the inner ring relative thereto;

wherein the threaded end of the bolt is threadedly received in a threaded hole in the end of the rotatable member in the interior space holding the inner ring against the end of the rotatable member for rotation therewith while applying a tensile preload force longitudinally through the bolt.

7. The bearing assembly of claim 6, further comprising an annular spacer positioned around the cylindrical portion of the bolt between the inner ring of the bearing and the head of the bolt for adjusting a longitudinal position of the bolt in the rotatable member.

8. The bearing assembly of claim 6, wherein the bolt can be unthreaded from the threaded hole in the end of the rotatable member and the outer ring dismounted from the support member to allow externally removing the bearing assembly from the enclosure and the rotatable member.

9. The bearing assembly of claim 8, wherein the enclosure comprises a feeder housing of an agricultural combine, and the rotatable member comprises a rock trap beater or conveyor sprocket shaft.

10. The bearing assembly of claim 9, wherein the support member comprises a side sheet of the feeder housing and the end of the rock trap beater or conveyor sprocket shaft is located closely adjacent to an interior surface of the side sheet.

11. An externally installable and removable preloaded bearing and shaft assembly supporting an end of a rotatable member of a feeder assembly of an agricultural combine, for rotation in an interior space in close proximity to a side of an enclosure of the feeder assembly, the bearing and shaft assembly comprising:

an elongate bolt including a cylindrical shaft portion extending longitudinally from a larger head to a threaded end; and a bearing including an inner ring and an outer ring supported around the inner ring for relative rotation therebetween, the inner ring including a center hole therethrough receiving the shaft portion of the bolt, and the outer ring including at least one mounting element fixedly mounting the outer ring to the side of the enclosure external to the interior space mounting the outer ring in or over an opening through the side of the enclosure, the at least one mounting element including a flange on the outer ring attached to the side of the enclosure by at least one externally located fastener;

wherein the threaded end of the bolt is threadedly received in a threaded hole in the end of the rotatable member in the interior space holding the inner ring against the end of the rotatable member for rotation therewith relative to the outer ring and the enclosure while applying a tensile preloading force longitudinally through the bolt.

12. The bearing and shaft assembly of claim 11, further comprising an annular spacer positioned around the shaft portion of the bolt between the inner ring of the bearing and the head of the bolt for adjusting a longitudinal relationship of the bolt and the rotatable member.

13. The bearing and shaft assembly of claim 11, wherein the bolt can be unthreaded from the threaded hole in the end of the rotatable member and the outer ring dismounted from the side of the enclosure for externally removing the bearing assembly from the enclosure and the rotatable member.

14. The bearing and shaft assembly of claim 11, wherein the enclosure comprises a feeder housing of the feeder assembly, and the rotatable member comprises a rock trap beater or conveyor sprocket shaft.

15. The bearing and shaft assembly of claim 14, wherein the side of the enclosure comprises a side sheet of the feeder housing and the end of the rock trap beater or conveyor sprocket shaft is located closely adjacent to an interior surface of the side sheet.

16. The bearing and shaft assembly of claim 15, further comprising an annular spacer positioned around the shaft portion of the bolt between the inner ring of the bearing and the head of the bolt for adjusting a longitudinal position of the bolt head relative to the rock trap beater or conveyor sprocket shaft.

17. A bearing and shaft assembly for mounting in an opening through a support member for supporting an end of a rotatable member for rotation relative thereto under an axial preload condition, comprising:

a bolt having a threaded end portion threadedly receivable and engageable in a threaded hole in the end of the rotatable member, an opposite end portion positionable in the opening through the support member including an enlarged head having a shoulder therearound facing the threaded end portion, and a cylindrical shaft portion extending between the threaded and opposite end portions; and a bearing having relatively rotatable inner and outer rings, the inner ring having oppositely facing axial ends extending around a central hole therethrough adapted for receiving the shaft portion of the bolt, and the outer ring including at least one mounting element for mounting the bearing on a side of the support member opposite the rotatable member in the opening through the support member such that the inner ring is rotatable relative to the outer ring and the support member;

wherein the bolt is insertable through the inner ring of the bearing and threadedly engageable with the threaded hole of the rotatable member for holding the inner ring of the bearing thereagainst for rotation therewith relative to the outer ring and the support member while exerting an axial tensile force on the bolt, and the outer ring is mountable in the opening through the support member, for supporting the end of the rotatable member for rotation on the support member.

18. The bearing and shaft assembly of claim 17, wherein the at least one mounting element for mourning the bearing comprises a flange extending around the outer ring and including an array of holes therethrough at spaced locations therearound and adapted for receiving threaded fasteners therethrough for mounting the outer ring in the opening.

* * * * *